(12) United States Patent
Smith, III

(10) Patent No.: US 6,637,459 B1
(45) Date of Patent: Oct. 28, 2003

(54) UNDERSEA HYDRAULIC COUPLING MEMBER WITH EXTERNAL PORT GUARD

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

(21) Appl. No.: 10/231,517

(22) Filed: Aug. 30, 2002

(51) Int. Cl.[7] ............................................... F16L 37/40
(52) U.S. Cl. ................. 137/613; 137/614.04; 251/149.7
(58) Field of Search ..................... 137/613, 614.04, 137/614.03, 614.05; 251/149.7, 149.6, 149.1

(56) References Cited

U.S. PATENT DOCUMENTS

| | | |
|---|---|---|
| 2,599,935 A | 6/1952 | Pasker |
| 2,727,759 A | 12/1955 | Elliott |
| 2,727,761 A | 12/1955 | Elliott et al. |
| 3,215,161 A | 11/1965 | Goodwin et al. |
| 4,506,863 A | 3/1985 | Quin et al. |
| 4,582,347 A | 4/1986 | Wilcox et al. |
| 4,754,780 A | 7/1988 | Smith, III |
| 4,799,512 A | 1/1989 | Sarson |
| 4,813,454 A | 3/1989 | Smith, III |
| 4,832,080 A | 5/1989 | Smith, III |
| 4,924,909 A | 5/1990 | Wilcox |
| 5,063,965 A | 11/1991 | Wilcox |
| 5,072,755 A | 12/1991 | Wilcox |
| 5,099,882 A | 3/1992 | Smith, III |
| 5,203,374 A | 4/1993 | Smith, III |
| 5,360,035 A | 11/1994 | Smith, III |
| 5,390,702 A | 2/1995 | Smith, III |
| 5,692,538 A | 12/1997 | Smith, III |
| 6,227,245 B1 * | 5/2001 | Smith, III .......... 137/614.04 X |

* cited by examiner

*Primary Examiner*—Kevin Lee
(74) *Attorney, Agent, or Firm*—Wong, Cabello, Lutsch, Rutherford & Brucculeri L.L.P.

(57) ABSTRACT

An undersea hydraulic coupling member includes an external port guard that covers radial or angled flow ports of the probe when the coupling member is disengaged. The port guard is biased to the extended position over the flow ports, and may be moved to a retracted position where hydraulic fluid may flow between the flow ports and the probe.

14 Claims, 1 Drawing Sheet

UNDERSEA HYDRAULIC COUPLING MEMBER WITH EXTERNAL PORT GUARD

BACKGROUND

1. Field of the Invention

This invention relates in general to hydraulic couplings, and specifically to hydraulic couplings used in undersea drilling and production applications. More particularly, this invention involves hydraulic coupling members having radial or angled flow ports.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore of the female member of the coupling. The male member also includes a connection at its other end to facilitate connection to hydraulic lines. When the cylindrical portion of the male member is inserted into the large bore of the female member, according to various embodiments of the device, fluid flow is established between the male and female members. Couplings of this type are shown in patents owned by National Coupling Company, Inc. of Stafford, Tex.

In undersea drilling and production applications, the male member of the coupling may be connected to a manifold plate or other securement at a subsea location at the inside or outside of a well bore. In many cases, the male members are positioned so that the end or leading face of each member points vertically up from the sea floor. The female members, which also may be secured to a manifold plate, are moved into position over the male members and then lowered onto the male members by a diver or subsea vehicle. When the female members are positioned on the male members, hydraulic fluid typically is from the female member to the male member of the coupling. In some cases, only the female member of the coupling has a poppet valve.

The poppet valve typically includes a conical valve face which seats, in the closed position, against a valve seat in the coupling member. The poppet valve opens to allow fluid flow, and closes against the valve seat within the bore to arrest the flow. Generally, the poppet valve is spring-biased to the closed position. The valve may include a valve actuator which may be a nose or stem extending from the apex of the valve face along the longitudinal axis of the poppet valve.

Frequently, well bores in which couplings are positioned are full of debris. The male member, which may remain subsea when the coupling is disconnected, is subject to debris accumulating in flow passages. The flow passages in the male member may be directly across the gap between the valve face and the valve seat, as shown in U.S. Pat. No. 4,694,859. Or, as shown in U.S. Pat. Nos. 4,654,780, 5,099,882 and 4,832,080 to Robert E. Smith, III, hydraulic flow may be radially between the members. Either configuration may be subject to ingress of debris. The debris may contaminate the hydraulic fluid or cause wear to the seals and sealing surfaces in hydraulic couplings and hydraulic systems.

U.S. Pat. No. 5,692,538 to Robert E. Smith, III describes an undersea hydraulic coupling member having flow ports that are angled to help prevent ingress of debris into the hydraulic lines when the coupling members are disconnected. The coupling of U.S. Pat. No. 5,692,538 includes a cylindrical passageway where the valve stem or actuator is positioned. Although the coupling of U.S. Pat. No. 5,692,538 can effectively prevent ingress of debris, it is desirable to increase the flow rate of hydraulic fluid through the coupling. Additionally, the poppet valve shown in U.S. Pat. No. 5,692,538 is opened in response to fluid pressure, rather than engagement of a valve actuator with the opposing valve actuator of the female member.

Accordingly, it is desirable to provide an undersea hydraulic coupling with radial or angled flow ports to help prevent ingress of debris, but that will have a higher flow rate through the coupling member and a valve actuator configured to open the valve when mutually engaged with the female coupling member valve actuator.

SUMMARY OF THE INVENTION

The present invention resides in an undersea hydraulic coupling member having an external port guard around the radial or angled flow passages in the probe. When the poppet valve of the coupling member is in the closed position, the external port guard is biased to a position in which it covers the flow ports.

BRIEF DESCRIPTION OF THE DRAWING

The FIGURE is a section view of a male member of a coupling according to one embodiment of the invention.

DETAILED DESCRIPTION

Figure 1:
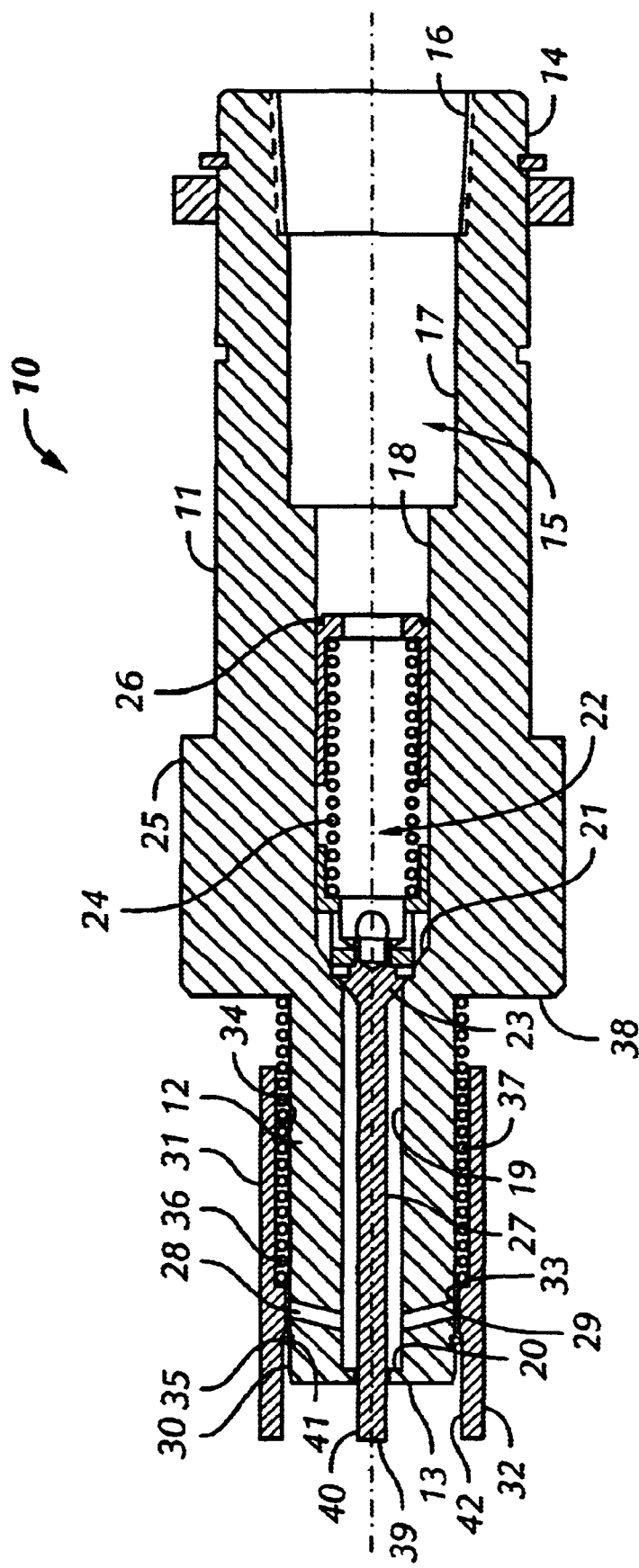

As shown in the FIGURE male coupling member 10 includes body section 11 and probe 12 which has a smaller external diameter than the body section. The first end or leading face 13 of the male coupling member is oriented typically to face up from the sea floor, and the second end 14 of the male coupling member may be attached to a manifold plate using threads or other means. Internal bore 15 extends through the male member, and in one embodiment includes a threaded bore section 16 for connection to hydraulic lines, a first section 17, a valve bore 18 having a smaller diameter than the first section, and a valve actuator bore 19 having a smaller diameter than the valve bore. The valve actuator bore extends to internal shoulder 20 adjacent the first end of the male coupling member. Conical valve seat 21 is located adjacent one end of the body section, between the valve bore and the valve actuator bore. The valve seat may be a tapered shoulder. The male member includes poppet valve 22 having a generally cylindrical body with conical valve face 23 which seals against the valve seat. The poppet valve is urged into the closed position by helical valve spring 24. The valve spring is anchored by spring collar 25 which may be held in place by snap ring of clip 26.

Extending from the apex of the conical valve face is valve actuator 27. In one embodiment of the invention, the valve actuator has an outer diameter of 50% or less than the diameter of the valve actuator bore. The diameter of the valve actuator may be dimensioned to optimize the flow rates of hydraulic fluid through the male member of the hydraulic coupling.

According to the present invention, the poppet valve is positioned in the body section, rather than the probe section of the male member. By positioning the poppet valve in the body section, the outer diameter of the probe may be reduced and the weight of the coupling member may be reduced without decreasing the flow rate of hydraulic fluid through the coupling. Accordingly, the present invention may advantageously be used in undersea hydraulic coupling wherein reduced size and enhanced flow rates are desired.

In one embodiment of the invention, flow ports 28, 29 extend between the valve actuator bore and the external surface 30 of the probe. The flow ports may be radial or angled. If the flow ports are angled, as shown in the FIGURE, the first or inner end of the flow port is adjacent the valve actuator bore, near the first end or leading face of the male member. The second or outer end of the flow port, at the external surface of the probe, is spaced further from the first end or leading face of the male member. In one embodiment of the invention, the flow ports may be 1/16 inch in diameter and spaced at regular intervals around the probe. When the valve actuator urges the poppet valve open, hydraulic fluid may be transmitted through the flow ports and through internal bore of the male coupling member. In one embodiment of the invention, the tip 39 of the valve actuator extends through bore section 40 and the face or first end of the coupling member. The male member S poppet valve may be urged open through application of mechanical force to the valve actuator, including mutual engagement of the tip of the valve actuator with the valve actuator of the corresponding female coupling member. In the embodiment of the FIGURE, only the probe of the male member enters the female member of the coupling. When the coupling members are fully engaged, the body section and poppet valve of the male member remain outside of the receiving chamber of the female member.

In one embodiment of the invention, when the male member is disconnected from the female member, external port guard 31 includes a sleeve that is biased to a position that covers the second or outer end of the flow ports. In the normally closed position, the external port guard helps keep suspended debris from entering the flow ports and internal bore of the male coupling member. In one embodiment, the external port guard may have a generally cylindrical outer surface 32 and a stepped inner surface including a first inner surface 33, a second inner surface 34 having a larger internal diameter than the first inner surface, and a third inner surface 42 also having a larger internal diameter than the first inner surface. Internal shoulders 35, 36 are on each side of the first inner surface. In one embodiment, when the external port guard is biased to the normally closed position, the first inner surface is positioned radially over the second end or outer end of the flow ports and blocks the flow ports from ingress of debris. To bias or urge the external port guard to the normally closed position, spring 37 may extend between shoulder 38 on the male member body and shoulder 36 on the external port guard. Clip 41 provides an external abutment or shoulder adjacent the first end of the probe to limit the longitudinal position of the external port guard.

Application of longitudinal force to the external port guard compresses spring 37 to urge the external port guard into the open position. In the open position, the second inner surface of the external port guard is positioned radially over the flow ports, and has an inner diameter sufficiently greater than the outer diameter of the probe so that hydraulic fluid may flow between the outer diameter of the probe and the second inner surface. The longitudinal position of the external port guard may be limited by shoulder 37.

The external port guard of the present invention may block the flow ports in the probe from entry of debris when the coupling is disconnected and the male member remains subsea. The external port guard may be opened when the probe is in the receiving chamber of the female member. The external port guard may be opened by contacting the receiving chamber or shoulder in the female member.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An undersea hydraulic coupling member comprising:
   a body having a first internal bore extending therethrough, a valve seat in the first internal bore, and a poppet valve sealing against the valve seat in the normally closed position;
   a probe attached to the body having an outer cylindrical surface and a second internal bore extending therethrough, the second internal bore smaller in diameter than the first internal bore, and a valve port extending between the second internal bore and the outer cylindrical surface;
   a valve actuator attached to the poppet valve and extending through the second internal bore; and
   an external port guard around the outer cylindrical surface of the probe biased to a normally closed position blocking the valve port.

2. The undersea hydraulic coupling member of claim 1 wherein the valve port is angled.

3. The undersea hydraulic coupling member of claim 1 wherein the external port guard is a sleeve with a stepped inner surface including a first inner surface blocking the valve port in the normally closed position.

4. The undersea hydraulic coupling member of claim 1 further comprising a spring between the external port guard and the body, to bias the external port guard to the normally closed position blocking the valve port.

5. The undersea hydraulic coupling member of claim 1 wherein the external port guard extends longitudinally from the probe.

6. A coupling member comprising:
   (a) a male member having a body with a first internal bore extending therethrough, a cylindrical probe extending from the first end of the body and having a second internal bore smaller in diameter than the first internal bore;
   (b) a plurality of angled flow ports extending outwardly from the second internal bore of the probe; and
   (c) a sleeve-shaped port guard removably attached to the probe, the port guard having a smaller diameter inner surface and a larger diameter inner surface, a spring between the port guard and the body to urge the port guard into an extended position in which the smaller diameter inner surface is positioned radially over the angled flow ports, the spring compressible to slide the port guard to a retracted position in which the larger diameter inner surface is positioned radially over the angled flow ports.

7. The coupling member of claim 6 further comprising a poppet valve in the first internal bore.

8. The coupling member of claim 7 further comprising a valve actuator extending from the poppet valve through the second internal bore.

9. The coupling member of claim 6 wherein the port guard has an internal shoulder, the spring engaging the internal shoulder.

10. An undersea hydraulic coupling member comprising:

a cylindrical body having a stepped outer surface with a first end and a second end, a stepped internal bore extending therethrough, a valve in the stepped internal bore, a valve actuator attached to the valve and extending out the first end of the body, and a plurality of flow ports between the stepped internal bore and stepped outer surface adjacent the first end of the body; and a port guard engaged to the cylindrical body in a first position covering the flow ports, and being slidable to a second position uncovering the flow ports; wherein the port guard is biased to the first position covering the flow ports.

11. An undersea hydraulic coupling member comprising:

a cylindrical body having a stepped outer surface with a first end and a second end, a stepped internal bore extending therethrough, a valve in the stepped internal bore, a valve actuator attached to the valve and extending out the first end of the body, and a plurality of flow ports between the stepped internal bore and stepped outer surface adjacent the first end of the body; and a port guard engaged to the cylindrical body in a first position covering the flow ports, and being slidable to a second position uncovering the flow ports; wherein the port guard has a stepped inner cylindrical surface with a first inner surface covering the flow ports in the first position.

12. An undersea hydraulic coupling member comprising:

a cylindrical body having a stepped outer surface with a first end and a second end, a stepped internal bore extending therethrough, a valve in the stepped internal bore, a valve actuator attached to the valve and extending out the first end of the body, and a plurality of flow ports between the stepped internal bore and stepped outer surface adjacent the first end of the body; and a port guard engaged to the cylindrical body in a first position covering the flow ports, and being slidable to a second position uncovering the flow ports; wherein the port guard extends from the first end of the cylindrical body in the first position.

13. An undersea hydraulic coupling member comprising:

a cylindrical body having a stepped outer surface with a first end and a second end, a stepped internal bore extending therethrough, a valve in the stepped internal bore, a valve actuator attached to the valve and extending out the first end of the body, and a plurality of flow ports between the stepped internal bore and stepped outer surface adjacent the first end of the body; and a port guard engaged to the cylindrical body in a first position covering the flow ports, and being slidable to a second position uncovering the flow ports; an internal shoulder in the port guard, an external shoulder on the cylindrical body, and a spring between the internal shoulder in the port guard and the external shoulder on the cylindrical body.

14. An undersea hydraulic coupling member comprising:

a cylindrical body having a stepped outer surface with a first end and a second end, a stepped internal bore extending therethrough, a valve in the stepped internal bore, a valve actuator attached to the valve and extending out the first end of the body, and a plurality of flow ports between the stepped internal bore and stepped outer surface adjacent the first end of the body; and a port guard engaged to the cylindrical body in a first position covering the flow ports, and being slidable to a second position uncovering the flow ports; wherein the port guard has a stepped inner cylindrical surface with a first inner surface covering the flow ports in the first position, and a second inner surface having an internal diameter larger than the outer cylindrical surface adjacent the first end of the body.

\* \* \* \* \*